United States Patent
Hess et al.

(10) Patent No.: US 6,784,597 B1
(45) Date of Patent: Aug. 31, 2004

(54) SELF-LOCKING NUT FOR STUD SHAFT AND STACKED WHEEL ASSEMBLY FOR THE ROTOR OF A ROTARY MACHINE

(75) Inventors: John Raymond Hess, Seneca, SC (US); Roger Clayton Walker, Piedmont, SC (US); Gabriel E. Robledo, Simpsonville, SC (US); Paul Jeffrey Meyer, Simpsonville, SC (US)

(73) Assignee: General Electric Company, Schnectady, NY (US)

( * ) Notice: Subject to any disclaimer, the term of this patent is extended or adjusted under 35 U.S.C. 154(b) by 268 days.

(21) Appl. No.: 10/413,222

(22) Filed: Apr. 15, 2003

(51) Int. Cl.[7] ................................................ F16B 27/00
(52) U.S. Cl. .................... 310/320; 411/84; 411/166; 411/180; 411/102
(58) Field of Search .......................... 310/217; 411/166, 411/180, 84

(56) References Cited

U.S. PATENT DOCUMENTS

| 5,226,788 | A | * | 7/1993 | Fledderjohn | ................. | 417/177 |
| 5,796,202 | A | * | 8/1998 | Herron et al. | ............... | 310/217 |
| 6,220,804 | B1 | * | 4/2001 | Pamer et al. | ................ | 411/180 |
| 6,428,272 | B1 |   | 8/2002 | Pepi et al. |   |   |

* cited by examiner

Primary Examiner—Nicholas Ponomarenko
Assistant Examiner—Iraj A. Mohandesi
(74) Attorney, Agent, or Firm—Nixon & Vanderhye PC

(57) ABSTRACT

Stacked wheels of the rotor of a rotary machine are axially coupled to one another by tie bolt assemblies. Each tie bolt assembly includes a stud having forward and aft ends. The aft end of the stud includes a self-locking nut to thereby lock the stud/nut assembly against rotation relative to the rotor.

20 Claims, 4 Drawing Sheets

SELF-LOCKING NUT FOR STUD SHAFT AND STACKED WHEEL ASSEMBLY FOR THE ROTOR OF A ROTARY MACHINE

BACKGROUND OF THE INVENTION

The present invention relates to a rotary machine and more particularly to a tie bolt and stacked wheel assembly for the rotors of such machines, wherein the tie bolts retain the stacked wheels in assembled relation without relative rotation between the tie bolts and the stacked wheels. Exemplary rotary machines to which this invention relates include turbines and/or compressors.

The rotors of rotary machines, such as turbines and compressors, are typically formed of axially stacked wheels, which hold individual blades about their periphery. For example, compressor rotors include a series of individual compressor wheels stacked together with a set of tie bolts extending generally axially through the stack. The wheels mount the blades which, together with stator blades, form the compressor stages. The tie bolts are typically elongated studs threaded at both ends for receiving nuts to maintain the wheels in stacked, assembled relation relative to one another. It will be appreciated, however, that tie bolts can have a headed end. In many such rotors formed of stacked wheels, the stacked wheels have ridge and groove arrangements along their interfaces so that the rotor torque can be carried through the stack. In a preferred form, however, sufficient clamp load is applied to the tie bolts to ensure that the rotor torque is carried through the stack by friction between the faces of the wheels and the nut faces.

It will be appreciated that any loosening of the nuts on the tie bolts would clearly reduce the tension on the bolts and, thus, lower the torque carrying capability of the rotor, eventually to unacceptable levels. Recognizing this problem, current design practice requires that the rotation of the nut relative to the bolt be prevented by redundant methods. One such method relies on the nut face friction against the threads and the stack. A second method of preventing rotation of the nut relative to the bolt is to run a jam nut against the primary nut to prevent its rotation relative to the stud.

It is also desirable to prevent rotation of the tie bolt assembly relative to the stacked wheels to facilitate assembly and ensure sufficient clamp load can be applied for rotor torque to be carried through the stack. A need remains for a reliable bolt and nut assembly mechanism that remains rotationally locked and assembled at all times to keep, e.g., the compressor wheels fully engaged during all operating conditions and in a manner which will not damage the tie bolt assembly or rotor.

BRIEF DESCRIPTION OF THE INVENTION

The invention provides a simple and reliable bolt and nut mechanism for holding e.g., the aft nut of a compressor during assembly operations and also that remains assembled at all times to keep the compressor wheels fully engaged during all operating conditions.

In an embodiment of the invention, a tie bolt and stacked wheel assembly for the rotor of the rotary machine is provided wherein the stacked wheels are joined one to the other in an axial array by tie bolts, more specifically studs, provided at opposite ends with nuts to define bolt assemblies. To prevent rotation of the stud and nut combination within the rotor, a self-locking nut is provided at the aft end of the stud.

Thus, the invention may be embodied in a self locking nut comprising: a main body; a forward radial flange defined at a first longitudinal end of said main body; an aft radial flange defined at a second longitudinal end of said main body; and a tab component projecting radially from a radially outer peripheral surface of said aft radial flange.

The invention is also embodied a stacked wheel assembly for the rotor of a rotary machine comprising: a plurality of stacked wheels for rotation about a common axis and forming part of the rotor; and a plurality of elongated tie bolts passing through aligned bolt holes of said stacked wheels for retaining the wheels in axially stacked relation, said plurality of tie bolts being spaced from one another circumferentially of the rotor; at least one of said tie bolts comprising a stud having a locking nut at least one of mounted to and defined at one longitudinal end thereof, said locking nut comprising at least one tab component projecting radially therefrom, wherein an end face of said plurality of stacked wheels includes a receptacle for receiving said locking nut and said at least one tab component.

The invention is further embodied in a method for retaining stacked wheels for the rotor of a rotary machine in an assembled relation comprising: stacking a plurality of wheels so as to align bolt holes respectively defined therethrough, to thereby define a plurality of tie bolt passages axially of said stacked wheels; providing at least one tie bolt comprising a stud having a locking nut at least one of mounted to and defined at one longitudinal end thereof, said locking nut comprising at least one tab component projecting radially therefrom; inserting said stud through a said tie bolt passage defined by aligned bolt holes of said stacked wheels; disposing said locking nut and said at least one tab component in a receptacle defined in an end face of said plurality of stacked wheels; and axially fixing said at least one tie bolt to said stacked wheels.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
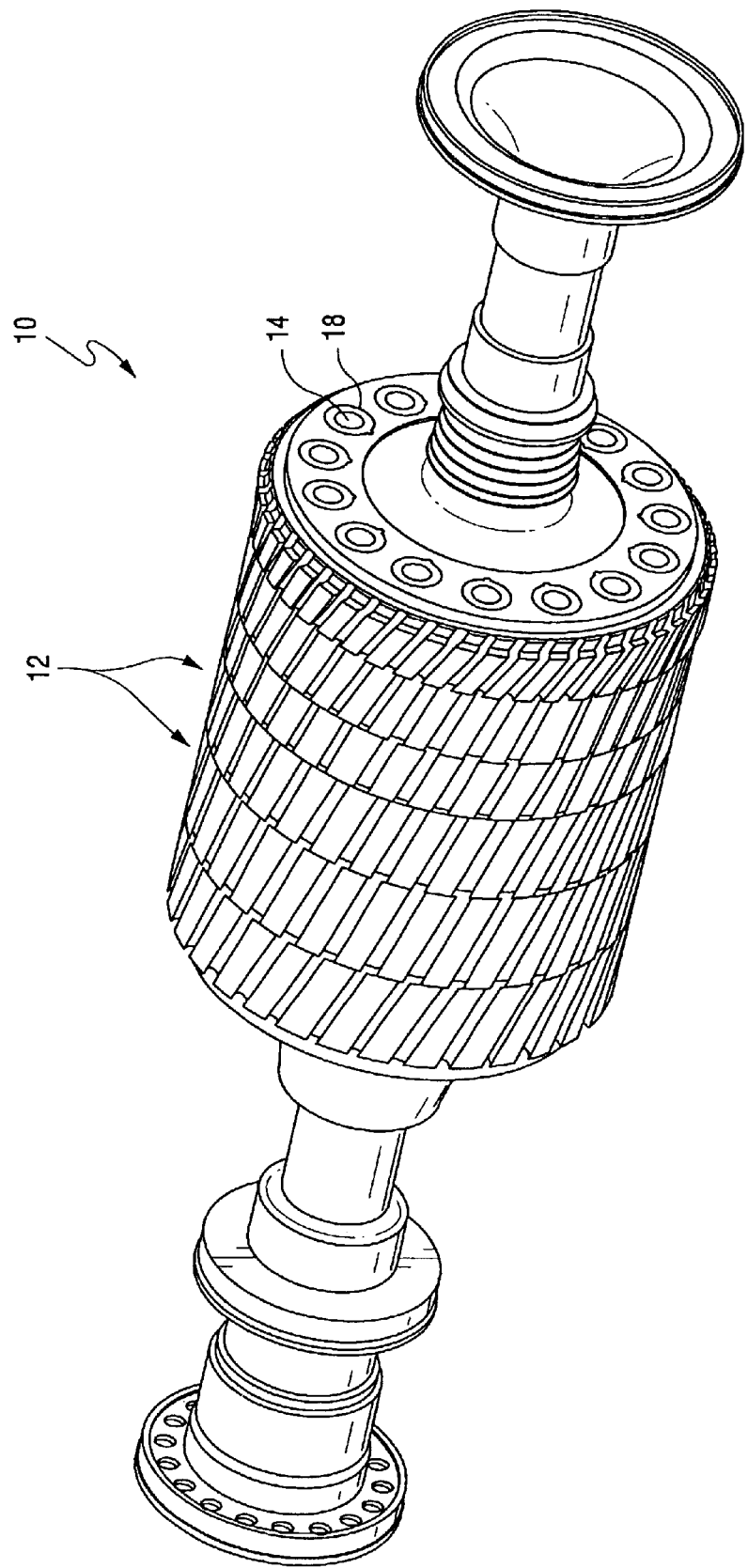
FIG. 1 is a perspective view of a rotor incorporating a self-locking nut embodying the invention.

By way of example, a compressor comprising a stacked wheel assembly and tie bolt embodying the invention is illustrated in FIG. 1. The compressor, generally designated 10, includes a plurality of wheels 12 axially stacked, each wheel mounting a plurality of circumferentially spaced compressor blades (not shown). The wheels are maintained in their axially stacked relation by a plurality of circumferentially spaced tie bolt assemblies. In the illustrated embodiment, each tie bolt assembly extends axially the length of the compressor. It is to be understood, however, that the invention may also be applied to compressor assembly wherein first and second tie bolt assemblies are provided coupling respective axial sets of stages to one another and overlap to maintain the compressor in axially stacked relation and keep the preload applied during the assembly process.

Each of the tie bolt assemblies includes a tie bolt, which may also be characterized as an elongated stud 14 having first and second longitudinal ends. In an exemplary embodiment, at the forward end of each stud (not shown), a locking nut assembly is provided. In this embodiment, a regular 12-point nut and a locking nut that prevents the former from disengagement are provided, although other locking nuts assemblies may be provided.

To rotationally lock the stud with respect to the stacked wheels, in an embodiment of the invention a self-locking nut 18 is provided at the aft end of the stud 14. The self-locking nut 18 may be formed at the aft end of the shaft but is more preferably separately formed and secured to the shaft. In an exemplary embodiment, the nut 18 is threaded to threads defined on the aft end of the stud 14, but the nut 18 may instead by secured to the stud by brazing or welding.

Figure 5:
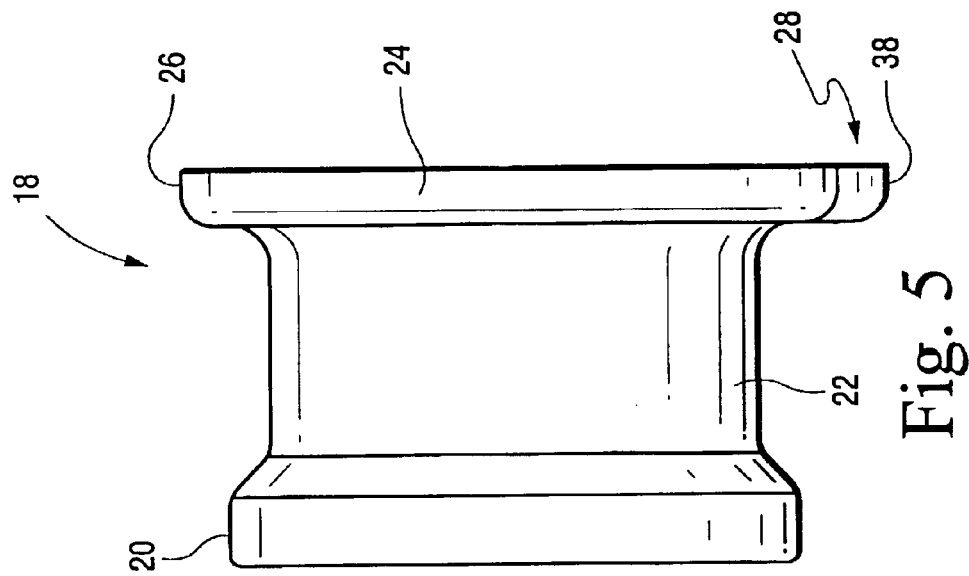
FIG. 5 is a side elevational view of the self-locking nut of FIG. 4.
Figure 4:
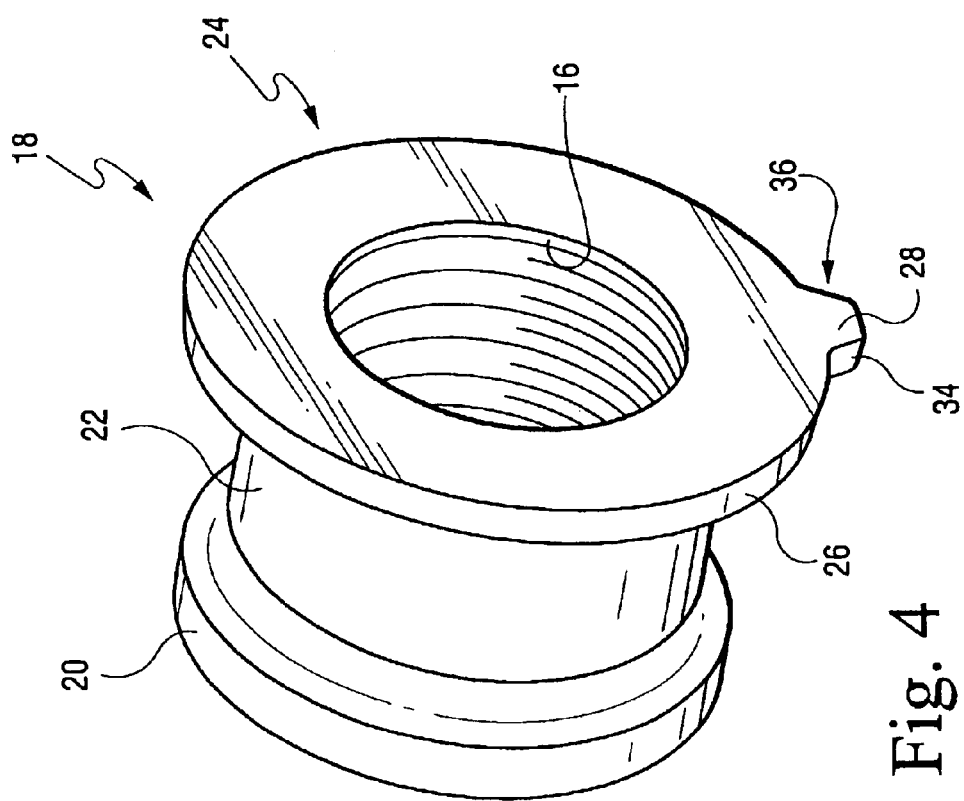
FIG. 4 is a perspective view of a self-locking nut embodying the invention.

Referring more particularly to FIGS. 4 and 5, in the illustrated embodiment, where the nut is secured to the stud 14, stud 14 is received in a bore 16 defined in self-locking nut 18. The nut has a generally circular base portion or flange 20 at the forward end thereof, a reduced diameter portion 22 which may carry or define facets for securing the self locking nut to the stud 14, and a circular head portion or flange 24 at the aft end thereof. At least one tab 28 is defined to project from the radially outer periphery 26 of the generally circular head portion 24.

Figure 2:
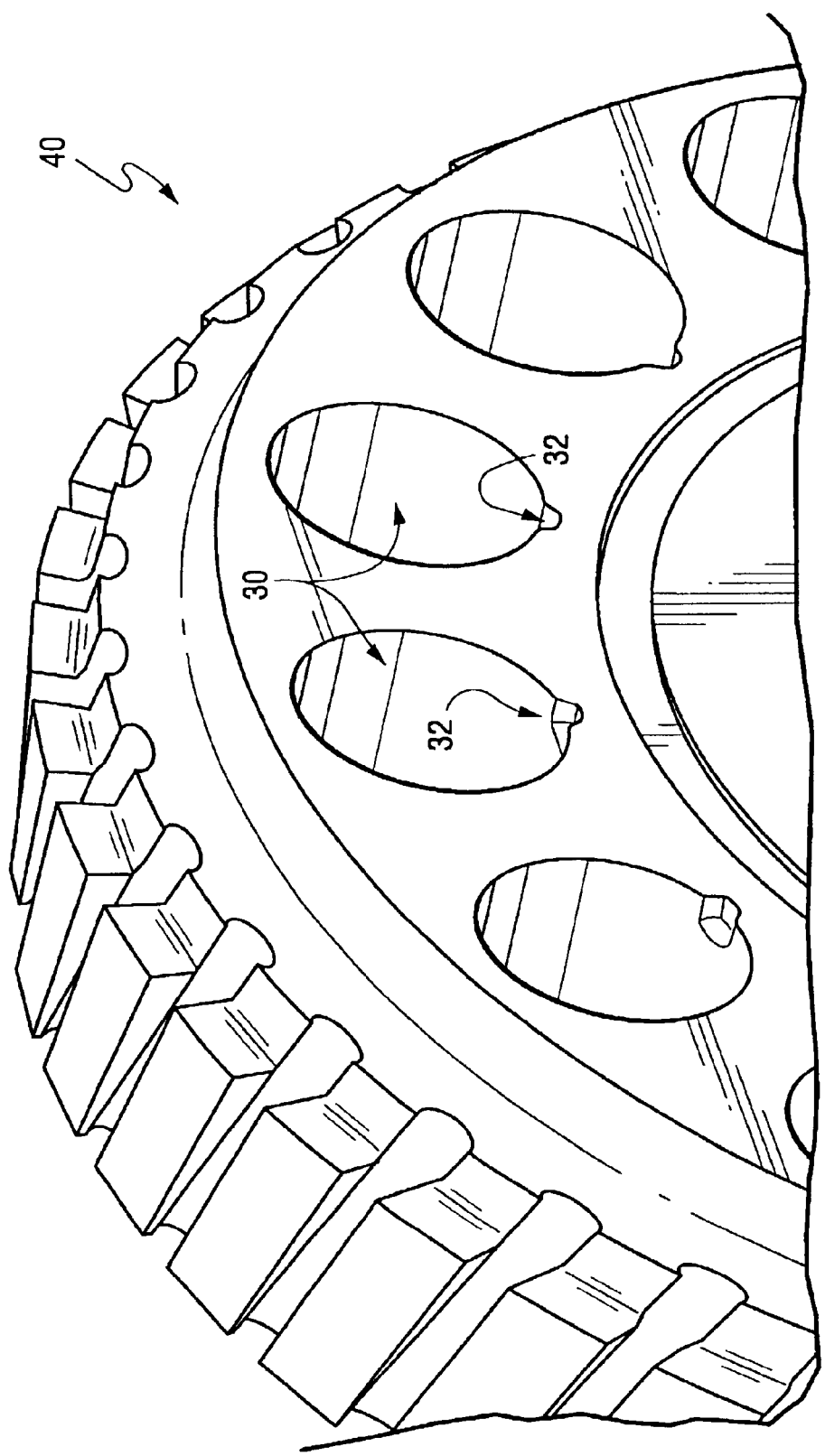
FIG. 2 is a schematic, broken away view of an aft wheel shaft for accommodating a self-locking nut embodying the invention.
Figure 3:
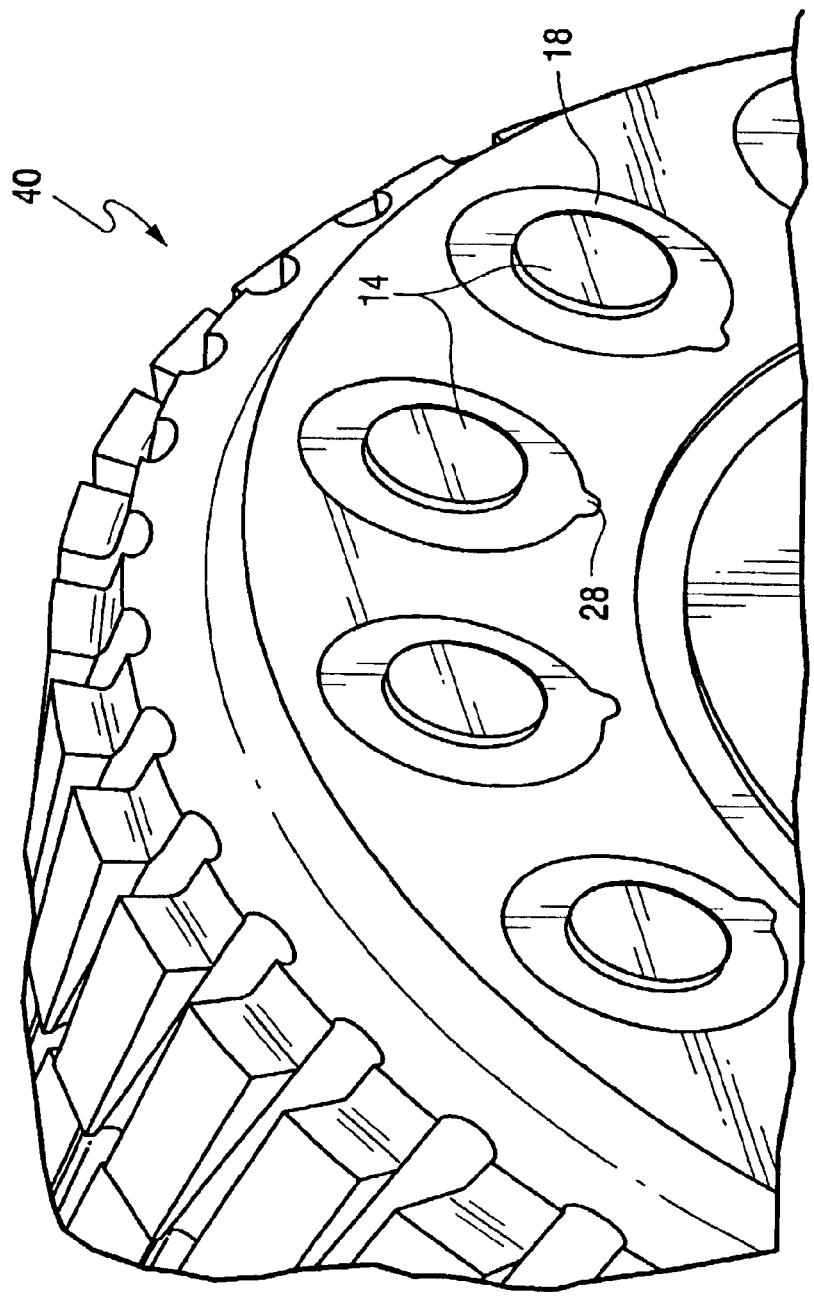
FIG. 3 is a view similar to FIG. 2 showing the self-locking nuts in position.

Referring to FIGS. 2 and 3, a receptacle or counter bore 30 is defined in the aft wheel shaft 40 for receiving self-locking nut 18. Furthermore, the tab 28 of the self-locking nut 18 engages a correspondingly sized and shaped cutout or notch 32, thus counteracting any slight rotational movement such as may be induced during compressor stud tensioning. In the illustrated embodiment, furthermore, the tab comprises inclined side surfaces 34,36 and an outer peripheral surface 38 generally parallel to the outer peripheral surface 26 of the aft flange 24 of the nut 18. It is to be understood, however, that tab configurations other than that illustrated may be adopted without departing from the invention. Thus, the tab may be more rounded than illustrated, or may have straighter sides than those shown. The particular size and shape of the tab may thus be determined as necessary or desirable for ease of manufacture and assembly. It is also to be appreciated that while a single tab is provided on the locking nut 18 of the illustrated embodiment, if deemed necessary or desirable, two or three tabs may be, e.g., symmetrically, provided about the circumference of the nut 18 and receptacle 30 for further resisting rotation of the assembly. As presently proposed, however, a single tab and receptacle should be sufficient to resist forces to which the nut is likely to be exposed and will reduce manufacturing costs.

As will be appreciated, the self-locking nut minimizes the weight of the nut/stud locking assembly. In addition, the locking mechanism is simple, thereby reducing manufacturing costs. Also, assembly is easily accomplished as there is only a single feasible position of the locking nut.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stacked wheel assembly for the rotor of a rotary machine comprising:
   a plurality of stacked wheels for rotation about a common axis and forming part of the rotor; and
   a plurality of elongated tie bolts passing through aligned bolt holes of said stacked wheels for retaining the wheels in axially stacked relation, said plurality of tie bolts being spaced from one another circumferentially of the rotor;
   at least one of said tie bolts comprising a stud having a locking nut at least one of mounted to and defined at one longitudinal end thereof, said locking nut comprising at least one tab component projecting radially therefrom, wherein an end face of said plurality of stacked wheels includes a receptacle for receiving said locking nut and said at least one tab component.

2. A stacked wheel assembly as in claim 1, wherein said receptacle is defined in a shaft of an aftmost one of said stacked wheels.

3. A stacked wheel assembly as in claim 2, wherein said receptacle comprises a counterbore shaped to receive said nut and including a cutout for receiving said tab component.

4. A stacked wheel assembly as in claim 1, wherein said locking nut comprises a main body, a forward radial flange defined at a first longitudinal end of said main body, an aft radial flange defined at a second longitudinal end of said main body, and wherein said tab component projecting radially from a radially outer peripheral surface of said aft radial flange.

5. A stacked wheel assembly as in claim 4, wherein said receptacle comprises a generally cylindrical counterbore shaped to receive said main body, said forward radial flange, and said aft radial flange.

6. A self locking nut as in claim 4, wherein a bore is defined axially of said main body and said bore is at least partially threaded.

7. A self locking nut as in claim 4, wherein said main body is generally circular in cross-section intermediate said flanges.

8. A self locking nut as in claim 4, wherein said forward flange is generally circular in cross-section.

9. A self locking nut as in claim 4, wherein said aft flange is generally circular in cross-section.

10. A self locking nut as in claim 4, wherein said tab component comprises inclined side surfaces and an outer peripheral surface generally parallel to said radially outer peripheral surface of said aft flange.

11. A stacked wheel assembly as in claim 1, further comprising a locking nut assembly secured to the other longitudinal end of said stud.

12. A self locking nut comprising:
   a main body;
   a forward radial flange defined at a first longitudinal end of said main body;
   an aft radial flange defined at a second longitudinal end of said main body; and
   a tab component projecting radially from a radially outer peripheral surface of said aft radial flange.

13. A self locking nut as in claim 12, wherein a bore is defined axially of said main body.

14. A self locking nut as in claim 13, wherein said bore is at least partially threaded.

15. A self locking nut as in claim 12, wherein said main body is generally circular in cross-section intermediate said flanges.

16. A self locking nut as in claim 12, wherein said forward flange is generally circular in cross-section.

17. A self locking nut as in claim 12, wherein said aft flange is generally circular in cross-section.

18. A self locking nut as in claim 12, wherein said tab component comprises inclined side surfaces and an outer peripheral surface generally parallel to said radially outer peripheral surface of said aft flange.

19. A method for retaining stacked wheels for the rotor of a rotary machine in an assembled relation comprising:

stacking a plurality of wheels so as to align bolt holes respectively defined therethrough, to thereby define a plurality of tie bolt passages axially of said stacked wheels;

providing at least one tie bolt comprising a stud having a locking nut at least one of mounted to and defined at one longitudinal end thereof, said locking nut comprising at least one tab component projecting radially therefrom;

inserting said stud through a said tie bolt passage defined by aligned bolt holes of said stacked wheels;

disposing said locking nut and said at least one tab component in a receptacle defined in an end face of said plurality of stacked wheels; and axially fixing said at least one tie bolt to said stacked wheels.

20. A method as in claim 19, wherein said receptacle comprises a counterbore shaped to receive said locking nut and including a cutout for receiving said tab component, said disposing including rotationally aligning said tab component with said cutout and axially displacing said stud to dispose said nut in said counterbore and engage said tab component with said cutout.

* * * * *